United States Patent [19]

Elliot et al.

[11] Patent Number: 5,528,670

[45] Date of Patent: Jun. 18, 1996

[54] VOICE MESSAGE-BASED ADMINISTRATION SYSTEM

[75] Inventors: Bernard M. Elliot, Philadelphia, Pa.;
Nicolas F. Elliot, Newton, Mass.;
Robert McConaghy, Scottsdale, Ariz.;
Charles W. Federico, Reading, Pa.;
Steve D. Mach, Lawrence, Mass.;
Thomas N. Gilmore, Philadelphia, Pa.

[73] Assignee: Grapevine Software, Inc., Philadelphia, Pa.

[21] Appl. No.: 6,242

[22] Filed: Jan. 19, 1993

Related U.S. Application Data

[63] Continuation-in-part of Ser. No. 698,997, May 13, 1991, abandoned.

[51] Int. Cl.⁶ .................................................. H04M 3/50
[52] U.S. Cl. ............................. 379/89; 379/67; 379/97; 379/204
[58] Field of Search .................................. 379/67, 88, 89, 379/90, 97, 204, 211, 214

[56] References Cited

U.S. PATENT DOCUMENTS

| | | |
|---|---|---|
| 4,071,698 | 1/1978 | Barger et al. . |
| 4,160,125 | 7/1979 | Bower et al. . |
| 4,580,012 | 4/1986 | Matthews et al. . |
| 4,581,486 | 4/1986 | Matthews et al. . |
| 4,585,906 | 4/1986 | Giammarrusco et al. . |
| 4,602,129 | 7/1986 | Matthews et al. .......... 379/67 |
| 4,611,094 | 9/1986 | Asmuth et al. . |
| 4,640,991 | 2/1987 | Matthews et al. . |
| 4,652,700 | 3/1987 | Matthews et al. . |
| 4,757,525 | 7/1988 | Matthews et al. . |
| 4,761,807 | 8/1988 | Matthews et al. . |
| 4,792,968 | 12/1988 | Katz . |
| 4,816,824 | 3/1989 | Katz . |
| 4,845,739 | 7/1989 | Katz .......................... 379/92 |
| 4,878,240 | 10/1989 | Lin et al. . |
| 4,930,150 | 5/1990 | Katz . |
| 4,932,046 | 6/1990 | Katz . |
| 5,014,298 | 5/1991 | Katz . |
| 5,016,270 | 5/1991 | Katz . |
| 5,073,929 | 12/1991 | Katz . |
| 5,091,933 | 2/1992 | Katz . |
| 5,109,404 | 4/1992 | Katz . |
| 5,113,380 | 5/1992 | Levine . |
| 5,117,451 | 5/1992 | Ladd et al. . |
| 5,185,787 | 2/1993 | Katz . |
| 5,197,000 | 3/1993 | Vincent . |
| 5,199,062 | 3/1993 | Von Meister et al. ................ 379/196 |
| 5,218,631 | 6/1993 | Katz . |
| 5,224,153 | 6/1993 | Katz . |
| 5,241,587 | 8/1993 | Horton et al. . |
| 5,251,252 | 10/1993 | Katz . |
| 5,259,023 | 11/1993 | Katz ........................................ 379/88 |
| 5,260,986 | 11/1993 | Pershan . |

OTHER PUBLICATIONS

"Getting Down to Basics", Article, *Teleconnect* (Apr. 1988).
"Vanguard Tele-Account", Brochure, The Vanguard Group (1990).

*Primary Examiner*—Jeffery Hofsass
*Assistant Examiner*—Fan Tsang
*Attorney, Agent, or Firm*—Panitch Schwarze Jacobs & Nadel; Robert Charles Beam

[57] ABSTRACT

Voice message based administration is a method that allows the directed and controlled collection and presentation of numeric and symbolic information between a group leader and a population of group members, thus allowing many previously impossible administration and management functions to be performed, including those commonly associated with Group Decision-Making Support Systems. The preferred embodiment is implemented as an extension to a Voice Message System. A group leader subscriber account is defined by the Voice Message system administrator. This account type has certain privileges not available to other subscribers. The group leader subscriber defines lists of other subscribers who become group members, the group leader also controls the access to and the content of data tables. The group leader initiates a "Session" on a topic with the group members. A variety of Session types are supported. Each session is made up of a set of items that contain a voice description and numeric or symbolic data. In data collection sessions, group member numeric or symbolic responses are collected and tallied for the leader, in some cases the individual responses are kept secret so that voting and confidential surveys can be performed. In data presentation sessions, numeric or symbolic data is prepared by the leader and can be examined by the members.

34 Claims, 12 Drawing Sheets

Group Member Main Menu
1. To listen to messages
    Listen to Messages Menu
      1. to repeat message
      2. to save message
      3. to erase message
      4. to reply to message
    End of Listen to Messages Menu
2. To send messages
    Destination ID or Distribution List Entered.
      then message is recorded.
3. For account administration
    Account Administration Menu
      1. to record spoken name
      2. to record spoken greeting
      3. to modify password
      4. to modify distribution lists
    End of Account Administration Menu
4. To attend group sessions
    Scan Group Session Menu
      1. to repeat description of the current session
      2. to attend current session
        Attending A Session Menu
          1. to repeat description of the current items
          2. to respond to current item
          #. to skip to next item
        End of Attending A Session Menu
      3. to send a comment message to the group leader
      #. to skip to next session
      *. to back-up to Main Menu (blind pick)
    End of Scan Group Sessions Menu
*. to hang-up call
0.   for help information (blind pick)
End of Group Member Main Menu

```
Group Leader Main Menu
1.   To listen to messages
2.   To send messages
3.   For account administration
4.   To attend group sessions
5.   To administer Sessions
        Administer Sessions Menu
          1.  to create a session
                Create A Session Menu
                  1. to create an Opinion Survey Session
                  2. to create a Priority Ranking Session
                  3. to create a Ballot Vote Session
                  4. to create a Meeting Scheduling Session
                  5. to create a Table Input Session
                  6. to create a Table Output Session
                End of Create a Session Menu
          2.  to remove a session
                Remove A Session Menu
                  1. to repeat description of the current session
                  2. to remove current session
                End of Remove A Session Menu
          3.  to restart a session
                Restart A Session menu
                  1. to repeat description of the current session
                  2. to restart current session
                End of Restart A Session Menu
          4.  to listen to the results of a session
                Listen To The Results Of A Session Menu
                  1. to repeat description of the current session
                  2. to listen to results of current session
                End of Listen to the Results of a Session menu
          #.  to skip to next session
          *.  to return to Group Leader Main Menu
            End of Administer Sessions Menu
*. to hang-up call
0.    for help information (blind pick)
End of Group Leader Main Menu
```

VOICE MESSAGE-BASED ADMINISTRATION SYSTEM

This Application is a Continuation-in-Part of U.S. patent application Ser. No. 07/698,997, filed May 13, 1991, now abandoned.

BACKGROUND OF THE INVENTION

This invention generally relates to the extension of Voice Message like systems such that they are better suited to performing specific administrative and management tasks, especially those tasks relating to group decision-making activities. It has become a common practice in many organizations to install a centralized Voice Message System which may be coupled with a Private Branch Exchange (PBX). There are a number of voice message systems known in the art and which are commercially available. These systems are used to automate the answering of incoming calls from outside telephone networks, as well as for coverage of telephone lines within the PBX's line domain. This is helpful for situations where the extension is busy or does not answer. In some cases these systems allow individuals to create distribution lists of subscribers which are also known simply as distribution lists. Voice messages can then be sent to those subscribers on such a list. On some systems voice message recipients can send a reply voice message to the message originator, or forward the voice message to other subscribers.

As Voice Message Systems have become popular, organizations have registered larger numbers of employees or members on the Voice Message System. The development of larger Voice Message Systems and their widespread use within organizations has created a situation where large communities of users all frequently access a system, and are familiar with its operation. Experience with Voice Message Systems has shown them to be a useful and important part of the way modern organizations function. Experience has also shown the limitations of the prior art. Prior systems provide non-existent, incomplete, or inadequate solutions to many functions and services that organizations must perform, especially those conducted by administrators and managers, and especially those associated with group decision-making techniques such as the Delphi and the Nominal Group approaches. In these cases the information to be sent, or the responses required, are often numeric or symbolic rather than verbal. Furthermore, each response should fall within a specific range. Also, in some cases individual responses should remain confidential, and the administrator or manager should only access totals. In some cases the numeric data is in tabular form, and the administrator wishes to present this table to the caller. This type of controlled numeric and symbolic dialogue must also be coupled with verbal messages.

SUMMARY OF THE INVENTION

This invention is intended to solve disadvantages in, and add new functionality to, the prior art. The current description defines a new type of system that performs Voice Message Based Administration (MBA) functions. This System is suitable for many previously unsolvable management, administration, and group decision-making tasks. In the Voice MBA System, a group leader subscriber account is defined by the Voice Message system administrator in the voice message system. This group leader account has certain privileges which may not be available to other subscribers. This group leader subscriber can define lists of other subscribers who are the group members. A single list may be used, or different lists may be used for each session. This group is then the basis for the exchange of information. Groups may be small, as would a task force investigating a problem, or as are many committees. Groups may also be large, as would the group of all employees at a certain location, or the group of all recruits below a certain rank, or as are all of the registered voters in a county.

Besides simply sending voice messages to this group, the Group Leader can prepare and establish Sessions for the controlled collection or presentation of numeric or symbolic items. Each session is of a particular type, has a specific topic, and is made up of one or more items. All of the items in a session are of the same type.

Two general classes of sessions are supported:

1) Data collection sessions which collect a set of numeric or symbolic data items from group members, and the subsequent optional insertion of this data into a table; and, 2) Data presentation sessions, which present tabular, numeric or symbolic data items to group members, with the tabular data being specific to the group or to the individual member.

There are several advantages to having the Voice Message Based Administration System be an extension to the Voice Message System rather than a stand-alone system. The individuals involved in group activities such as decision-making can use the Voice Message System for off-line discussions. The caller interfaces are similar, making both easier to learn and use. The Voice Message System provides a community of frequent users.

Thus, according to one embodiment of the present invention, there is disclosed a voice message system having a group of subscribers who may, by telephone, leave recorded messages for other subscribers and access recorded messages from other subscribers, wherein the improvement comprises the addition to said voice message system of a voice message based administration system wherein at least one subscriber may enable any of a number of controlled data collection interactions with other subscribers, wherein said enabling subscriber:

a) chooses a session type from the available controlled data collection interactions;

b) defines necessary data insert statements for the chosen session type, to export collected data;

c) identifies a population of designated subscribers from the group of subscribers of the voice message system, which designated subscribers may take part in said controlled data collection interaction; and, d) provides a descriptive recorded message for each data collection item in said session.

According to another embodiment of the present invention, there is described a voice message system having a group of subscribers who may, by telephone, leave recorded messages for other subscribers and access recorded messages from other subscribers, wherein the improvement comprises the addition to said voice message system of a voice message based administration system wherein at least one subscriber may enable any of a number of controlled data presentation interactions with other subscribers, wherein said enabling subscriber:

a) chooses a session type from the available controlled data presentation interactions;

b) defines necessary data selection statements for the chosen session type, to extract the presented data;

c) identifies a population of designated subscribers from the group of subscribers of the voice message system, which designated subscribers may take part in said controlled interaction; and, d) provides a descriptive recorded message for each presentation item in said session.

According to still another embodiment of the present invention, there is described a voice message system having a group of subscribers who may, by telephone, leave recorded messages for other subscribers and access recorded messages from other subscribers, wherein the improvement comprises the addition to said voice message system of:

a voice message based administration system wherein at least one subscriber may enable any of a number of controlled data presentation and collection interactions with other subscribers, wherein said enabling subscriber:

a) chooses a session type from the available controlled data presentation and collection interactions;

b) defines necessary data selection statements for the chosen session type, to extract the presented data;

c) defines any necessary data insert statement to export the collected data;

d) identifies a population of designated subscribers from the group of subscribers of the voice message system, which designated subscribers may take part in said controlled data presentation and collection interaction; and, e) provides a descriptive recorded message for each data presentation item and data collection item in said session.

BRIEF DESCRIPTION OF THE DRAWINGS

FIGS. 6A through 6D are flow charts that illustrate a voice interface menu structure for group member access to the group sessions as may be utilized by the preferred embodiment.

FIG. 7 is a diagram that illustrates a voice interface menu structure for group leader access to the group administration sessions as may be utilized by the preferred embodiment.

DETAILED DESCRIPTION OF THE PRESENT INVENTION

Figure 1:
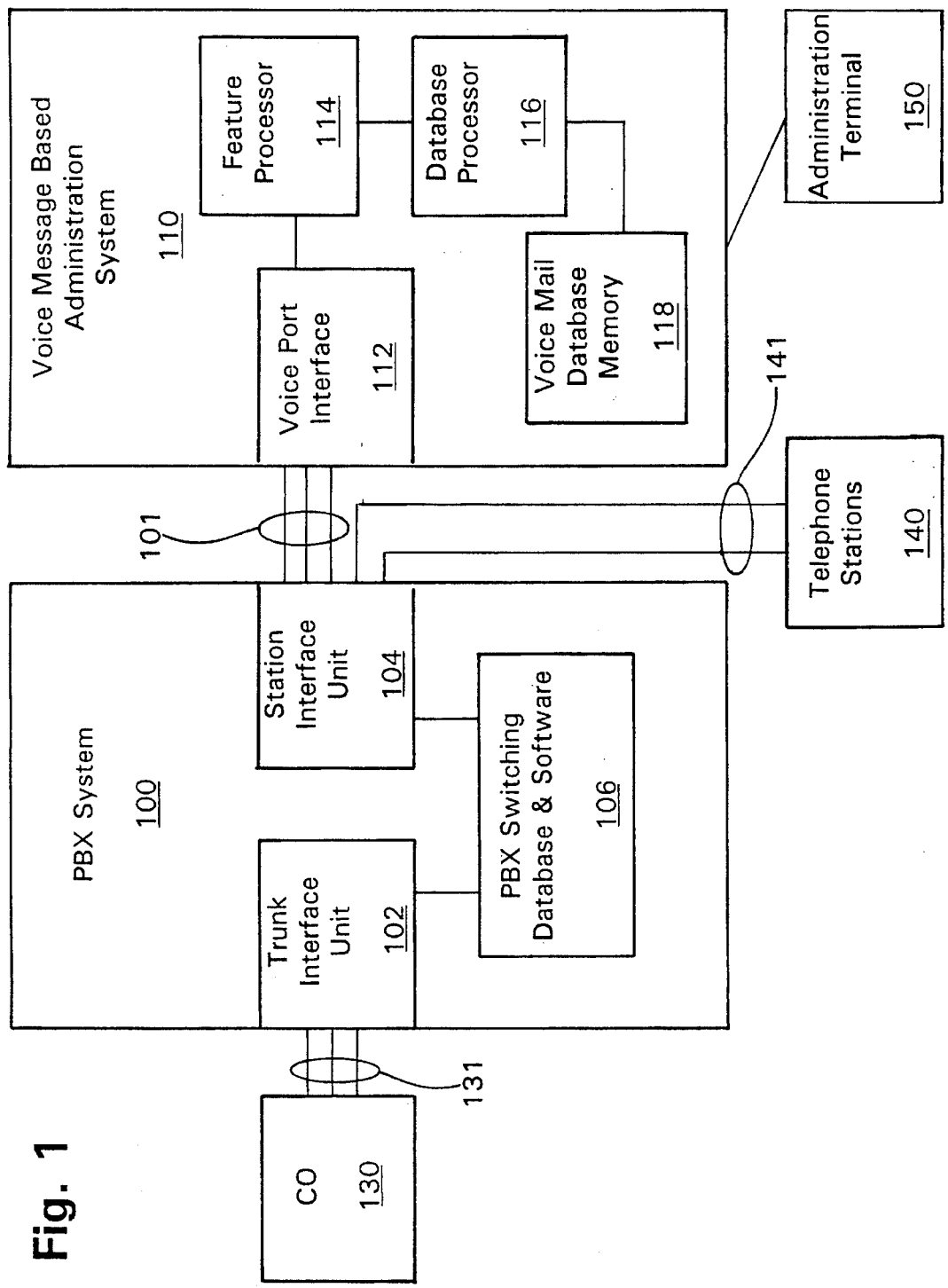
FIG. 1 is a block diagram illustrating a typical telephone system interconnecting with a Voice Message System as defined in prior art further provided with the Voice Message Based Administration System of the present invention as an overlay.

The Voice Message Based Administration System (VMBAS) provides services that enhance the prior art of Voice Message Systems (VMS), allowing new administration and management functionality. The VMBAS is accessed and administered in the same way as are typical Voice Message Systems. There is a telephone interface for subscribers, that allows them to negotiate a voice menu system. These subscribers can listen to messages, record messages, and enter Dual Tone Multi-Frequency data such as an ID number or a menu pick. A standard for Voice Message System Interfaces is currently defined and is being considered by the American National Standards Institute (ANSI). The interface embodiment described here is consistent with that standard. Voice Message Systems are typically administered via a combination of voice interface and keyboard interface. The keyboard interface is used to set up subscriber records in the database. The telephone interface is used to perform voice oriented administration functions such as recording prompts.

The proposed Voice Message Based Administration System is accessed in a manner similar to that used by Voice Message Systems, but it extends functionality in several important ways. The Voice Message Based Administration System adds a class of subscribers who are "group leaders". The leader may conduct a variety of session types with the members of the group. These sessions allow the leaders to exchange (collect or present) numeric, symbolic, voice, and tabular data with group members. Each exchange takes place according to well defined procedures thus insuring that certain constraints are enforced.

Currently envisioned session types are listed below for illustrative purposes. They all follow the same general pattern, and more uses for interactions or exchanges of this kind will undoubtedly be defined in the future.

1. Opinion Survey Session
2. Priority Ranking Session
3. Ballot Vote Session
4. Meeting Schedule Session
5. Table Input Session
6. Table Output Session Each session is defined and initiated or "released" by the group leader. When released, the session is attended by group members. A session is made up of one or more entries. Each entry represents a unit of data exchange, for instance one question on a survey.

Three types of activity are defined for sessions:

1) The activity of a group member who is attending a session on the telephone.

2) The activity of a group leader who is administering these sessions for the group on the telephone.

3) The activity of a group leader or of the Voice System Administrator who is performing database administration functions at a terminal.

In practice, these sessions can be employed independently or as an integrated set of management tools. The basic product is a Voice Message System with an automated attendant. The Voice Message System is based on a public domain human interface standard. This system answers calls for subscribers, and saves the messages. The subscribers can then call in and retrieve their messages. Such a system can be, and often is, integrated with a Private Branch Exchange (PBX) exchange so that call forwarding and call coverage can be effected. There are various versions of equipment to perform these functions, but the system of the present invention is believed to perform in a particularly effective way.

Within the system of the present invention, there may be a number of "sessions" or "management tools", which could be used as individual stand-alone products. This set of tools are, however, intended to be integrated into a voice message system with an established subscriber base, and may be accessed by a subscriber during a voice message session.

There are various advantages to having these facilities coupled with a voice message system, the most basic being that such a system forms a "community" of users and groups who might access a common set of integrated services. These users all check for messages frequently, and have proper Identification protocols (User ID's and Passwords) to permit access to the tools. Further, the tools are all provided with a similar interface, so that their use can be easily learned.

The management tools which the system of the present invention might provide as part of such an integrated package could be the following:

1. Voice Message System—Although a Voice Message System itself is no longer novel, and although the system of the present invention can operate as a stand-alone entity, a version of a traditional Voice Message System would be included as part of the integrated package.

2. Meeting/Scheduling Tool—This tool is intended for use by an administrator and/or a group leader for use in scheduling a meeting. The administrator or an assistant would fill out a meeting form on a computer screen. The form would describe the meeting, including any of the following items:
   a) the person calling the meeting;
   b) a description of the meeting (voice description);
   c) a list of participants, including any who are designated as critical;
   d) the number of participants who must attend to constitute a quorum; and,
   e) the alternative times and locations.

Then each voice message system subscriber who is to be a participant in the meeting will receive the message that a meeting has been called, and can listen to the voice description of the meeting. They can then indicate the alternatives where they could attend.

When all the critical participants and a quorum of all participants have replied favorably with respect to a particular meeting alternative, a notification is sent to all participants formalizing the meeting date. Alternatively, if no quorum is reached, the participants are notified that the meeting will be rescheduled.

As an additional useful feature, the voice message system is provided with a reminder notice to all participants sent at a suitable time prior to the meeting.

3. Shift Scheduling Tool—This tool would allow an administrator and/or a group leader to assign work shifts, and further designate the employees assigned to each. Voice Message System subscribers may then call and examine these schedules to determine:
   a) what shifts they are scheduled for; and,
   b) what other employees are assigned to the same or other shifts.

The employee/subscribers would also be able to leave messages for their supervisor or other employees. An alternative version would allow the employees (or volunteers, in a non-employment situation) to select their own shifts.

4) Voice Forum Tool—This tool would provide a semi-public forum for discussion of a particular issue. Once such a "forum" were established on a particular topic, that forum would be a type of "subscriber", and regular subscribers with the forum password may access the recorded comments in the forum, which would be "saved" messages. These subscribers could also make entries into the forum using the standard Voice Message codes and their ID.

5) Nominal Group Decision-Making Support Tool—this tool allows the use of several well known decision support techniques by subscribers. Among these are the Delphi technique which is traditionally used for forecasting and predictive activities, and the Nominal Group Technique which is used to overcome some of the problems of interactive meetings, and is typically applied to problem identification, problem solving, and program planning tasks. These techniques require that a group leader present descriptive information to group members and collect anonymous responses of a numeric or symbolic type from the members.

Often these techniques require a group leader/facilitator to first survey the group for ideas, problems, or solutions depending on the task at hand. This would be performed by the group leader who would prepare Voice Message Based Administration System group sessions of different types. These ideas, solutions, or alternatives are then presented to group members. The members respond to the choices, ranking them and voting on them anonymously. In some cases, this ranking and voting process is repeated in an iterative manner until convergence or divergence is reached. These tools can be used to simply help prepare meeting participants before hand, or it can be used to work with experts located in different areas and time-zones on strategic decisions.

The administrator can access the results by telephone or from a screen on the system management computer.

6) Input/Output Table Tool—This tool would allow tables to be defined in a database by an administrator. Voice Message System subscribers may then access these tables either to leave or retrieve data. Since they are accessed within the Voice Message System, the Subscriber's ID can be recorded as part of the transaction.

Examples where an Input Table would prove useful are the following applications:
   a) Time and Expenses—Subscribers can enter the hours worked on each project or each client to be compiled by a central billing agency;
   b) Time Card—Subscribers can enter their hours worked each day or their miles traveled, etc.;
   c) Field Worker Data Entry—Subscribers can enter appropriate field data; and,
   d) Order Entry—Subscribers may place orders.

Examples where an Output Table would prove useful are the following applications:
   a) Rate and Spot Pricing—Sales agents in the field may obtain the latest pricing on a variety of different items;
   b) Vacation & Sick Day Availability—Employees may access a table that contains the number of such days available to them;
   c) Order Tracking—Subscribers such as sales staff or purchasers may obtain information on the status of an order; and,
   d) Inventory Query—subscribers such as sales staff or purchasers may obtain information on the available inventory of a particular item of interest.

DETAILED DESCRIPTION

A voice message based administration system is described. In the following description, numerous specific details are set forth such as specific prompts and menus, specific session types, etc. in order to provide a thorough understanding of the present invention. It will be obvious, however, to one of ordinary skill in the art that the present invention may be practiced with modifications of these specific details. In other instances, well-known circuits, structures, and techniques have not been shown in detail in order not to unnecessarily obscure the present invention.

The present invention discloses an improved interface and method of operation of a voice message system (VMS) in which the system is suitable for performing advanced administrative and management functions, i.e., Message Based Administration.

The Voice Message Based Administration System, like a Voice Message System, functions as an extension to a telephone system, this is shown in FIG. 1. In such a system, calls may reach the Voice Message System 110 via the Private Branch Exchange (PBX) 100 as well as the Central Office (CO) 130. Outside callers may place calls from any telephone to the PBX, such calls being routed through a central office and onto trunk lines 131 which couple the central Office with a trunk interface unit of the PBX 102. In such a telephone system, a call may be transferred by the PBX Switching Database and Software 106 to a particular extension via the station interface unit 104 of the PBX. Similarly, calls may be placed from telephone stations within the domain of the PBX 140. Such calls would be routed into the PBX station interface unit via station lines 141, and would then be handled by the PBX Switching Database and Software in a manner similar to outside calls. The switching database and software directs and supervises connections by controlling the Trunk Interface Unit and the Station Interface Unit. An alternative method of accessing the Voice Message System, is via lines that connect directly to the Central Office 130; in this case the PBX is bypassed. Calls routed to the Voice Message System connect to the Voice Port Interface 112. Voice Port Interfaces exist for almost every type of line and trunk group that exist. The examples mentioned are illustrative, however, it will be obvious to one of ordinary skill that many alternative line routes and line or trunk group types for accessing the Voice Message System are possible. Furthermore, although the above description makes reference to a specific Private Branch Exchange stored program controlled telephone switching system, other telephone switching systems, such as key systems, Centrex systems, or hybrid systems, provide similar switching services. The methods for processing calls described herein may be practiced in a telephone system utilizing an external voice message system or may be equally practiced in a telephone switching system which provides the features of a voice message system as an integral function of the switching system.

Figure 3:
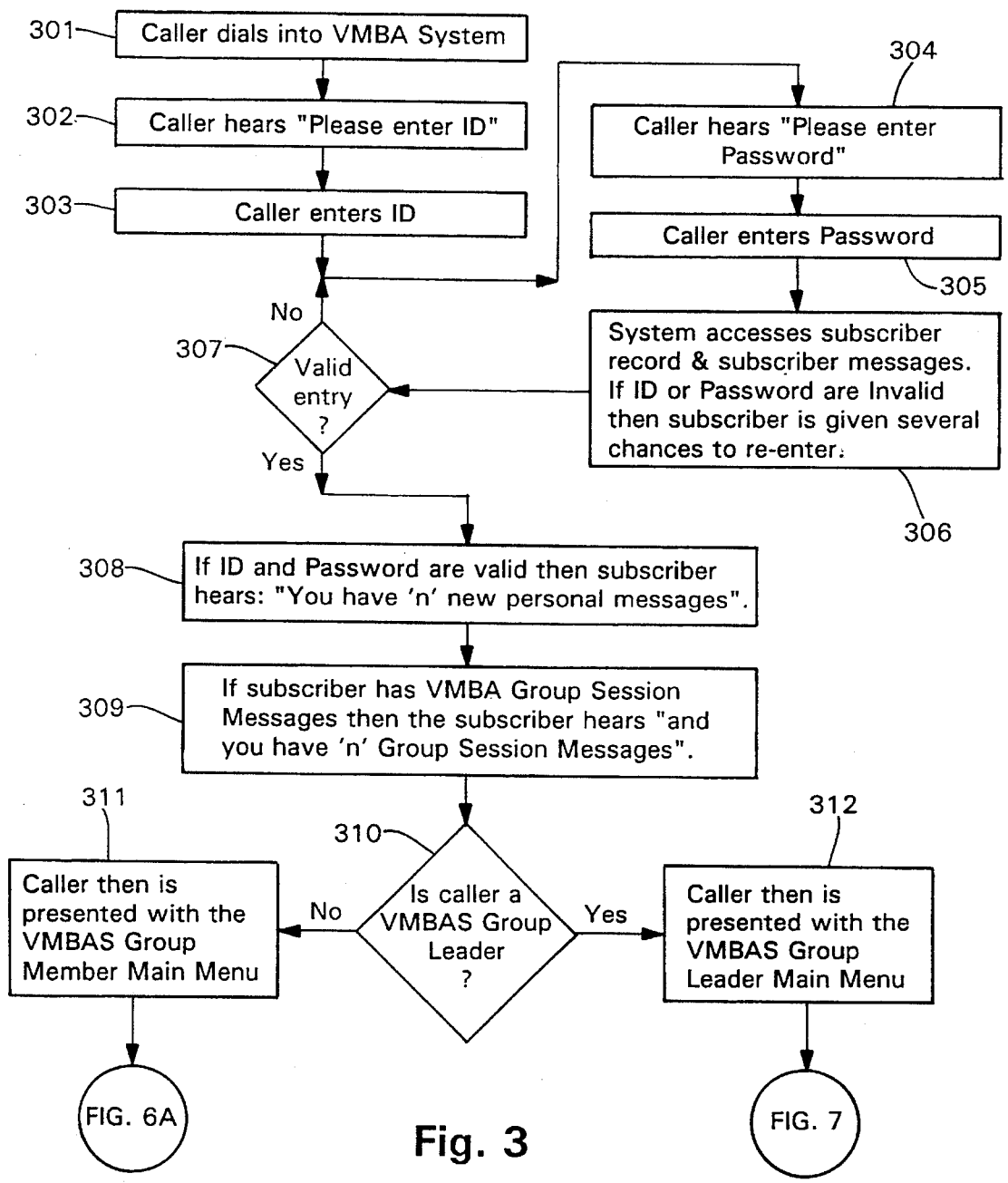
FIG. 3 is flow chart illustrating a method of handling subscriber calls into a Voice Message System as defined in prior art, that has been enhanced as a Voice Message Based Administration System.

A typical Voice Message Based Administration System 110, like a Voice Message System as described in prior art, is made up of a Voice Port Interface Unit 112, has a feature processor 114, a database processor 116, a voice mail database memory 118, and an Administration Terminal 150. The preferred implementation would have similar functionality, but would not use separate processors, but rather separate processes. The Voice Port Interface Unit 112 provides telephone line 101 control, and voice encoding capabilities. Line control activities include: ring detection; answering and disconnect supervision, and tone detection. The voice encoding capabilities include the ability to digitize, compress, decompress, and buffer voice. The Feature Processor 114 provides the various system level features associated with the voice message based administration system services. These include, but are not limited to:

Answering incoming calls and collecting messages from callers;

Handling subscriber calls including those shown in FIG. 3; and,

Delivering messages to destination subscriber mailboxes.

The Database Processor 116 is a back-end file and database system. It serves to off-load file and database operations from the feature processor. It also provides non-volatile storage for both voice and non-voice files in the form of a Voice Mail Database Memory 118. The voice files include announcements and messages, the non-voice files include system programs, system data, user data, and the like. The database processor provides basic file system support for voice mail service with functions which include, but are not limited to:

File system management functions (e.g., create, modify, delete, backup, recover, and report status of files and file systems);

File manipulation functions (e.g., insert, modify, delete data in a file);

File level concurrency control functions; and,

Database administration and maintenance functions.

Figure 2:
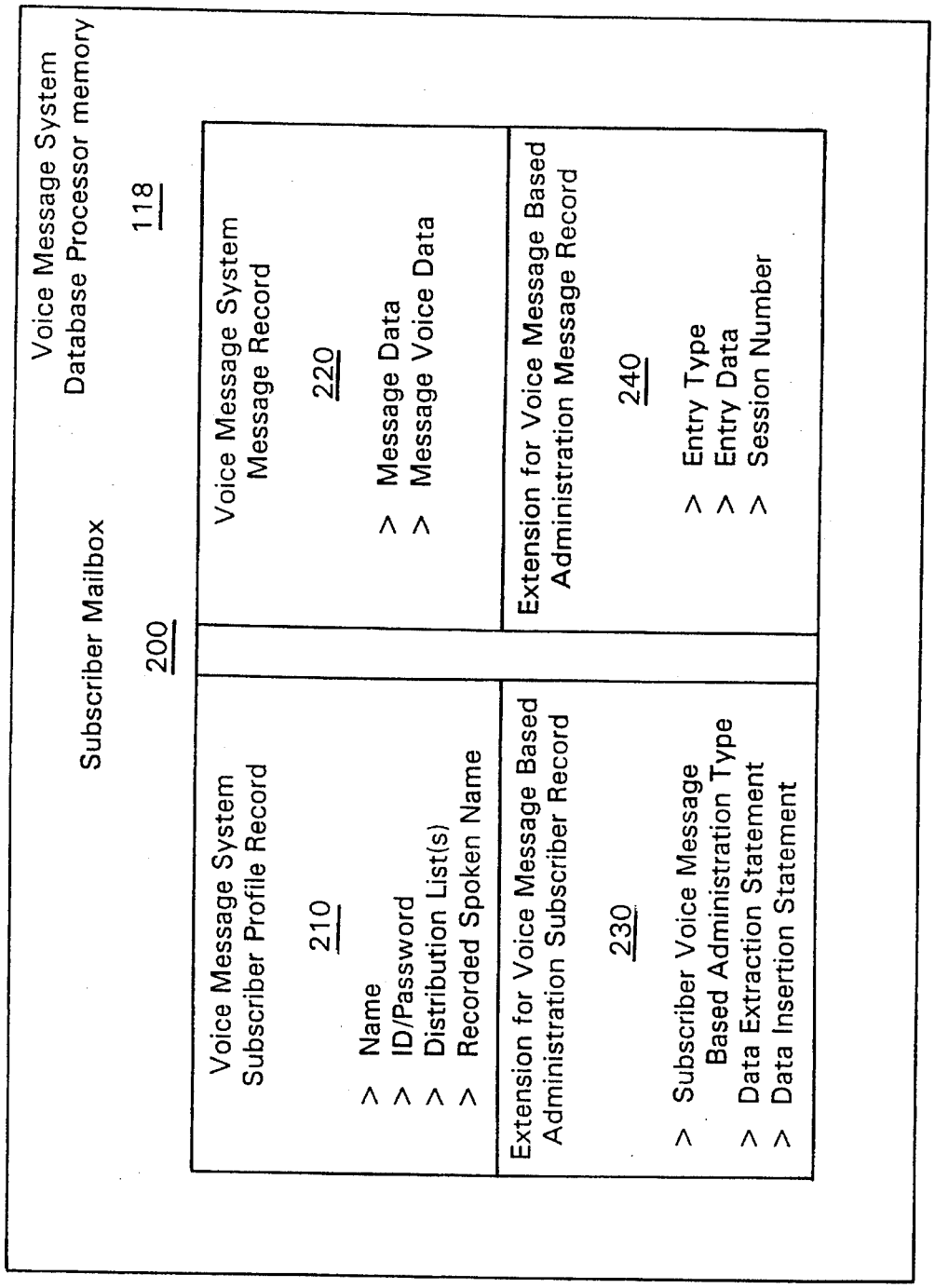
FIG. 2 is a block diagram illustrating a typical Voice Message System as represented in the memory of the database processor as defined in prior art with extensions making it suitable as a Voice Message Based Administration System.

The Database Memory contents relevant to this discussion are shown in FIG. 2.

As shown in FIG. 2, a typical Voice Message System includes a plurality of subscriber mailboxes, one mailbox for each subscriber. A mailbox 200 has two functional parts, one contains subscriber profile information 210, and the other message records 220. Each mailbox has a unique ID number. In some cases the ID number is the same as the subscriber's extension on the PBX, allowing Voice Message System to be tightly integrated with the PBX. A book of the subscribers and their ID's or telephone extensions is typically printed and distributed by the system administrator. In this way all subscribers know the ID's of all other subscribers. The subscriber profile 210 includes fields of information that define the associated subscriber and the services he or she is entitled to. In addition to subscriber ID, this information typically includes subscriber name, distribution list(s) that are in initially empty, class of service, password, community ID, recorded voice name, covering extension, etc. The message portion 220 of the mailbox 200 contains incoming voice messages and outgoing messages sent and saved, or scheduled to be sent. In addition to voice data, typical messages contain control information that indicate the originating subscriber, the time that the message was posted, etc. The present invention adds three fields 230 to the subscriber profile 210. The Subscriber Voice Message Based Administration Type field contains a flag that indicates that this subscriber can access those Voice Message Based Administration features that allow Voice Message Based Administration group sessions to be established and administered. The Data Extraction Statement and Data Insertion Statement fields contain instructions used by Table Output and Table Input type sessions respectively. The present invention also adds additional record information 240 to the voice message record 220. The Session Number associates a set of messages to be handled as a group and is unique to that group of messages. Entry Type information defines type of entry data to expect and the type of group session that will be used to control the data entry or playback. The Entry Data field contains the data that is collected from or presented to the group members.

FIG. 3 shows an illustrative flow chart for typical-access to a Voice Message System that has been enhanced to function as a Voice Message Based Administration System.

In the preferred embodiment, the caller accesses the feature processor portion of the system 301 via the Voice Port Interface Unit. A dialogue is established between the caller and the feature processor. The feature processor typically speaks prerecorded voice prompts, and expects the caller to enter Dual Tone Multi-Frequency telephone codes in response. The Dual Tone Multi-Frequency input is converted to numeric input by the Voice Port Interface Unit. An alternative approach allows the caller to speak the responses from a limited range of vocabulary that has been pre-loaded into the Voice Port Interface Unit. Such a system will use speech recognition circuits on the Voice Port Interface Unit to convert the spoken input to a predetermined numeric input based on the loaded vocabulary. This input would then guide feature processing in the same way as Dual Tone Multi-Frequency input.

The caller enters his or her ID and password when prompted by the system 302 to 305. The system then accesses the subscriber profile record and message records 306. If subscribers fail to enter a valid ID they are allowed several retries 307, and if they continue to fail to enter valid codes, security measures are enacted to either terminate the call, or possibly to trace the origin of the call if malfeasance is suspected. If the caller has entered a valid ID and Password, they then enter the messaging mode of the system 308. They first hear the stated number of new, unsaved messages that they have received, and then are told of the number of new unanswered Group Session Messages that they have received 309. The caller then is presented with one of two Main Menus 310. The group member menu FIG. 6A differs from the group administrator menu FIG. 7 in that the administrator has an extra selection for administering group sessions.

Figure 6B:
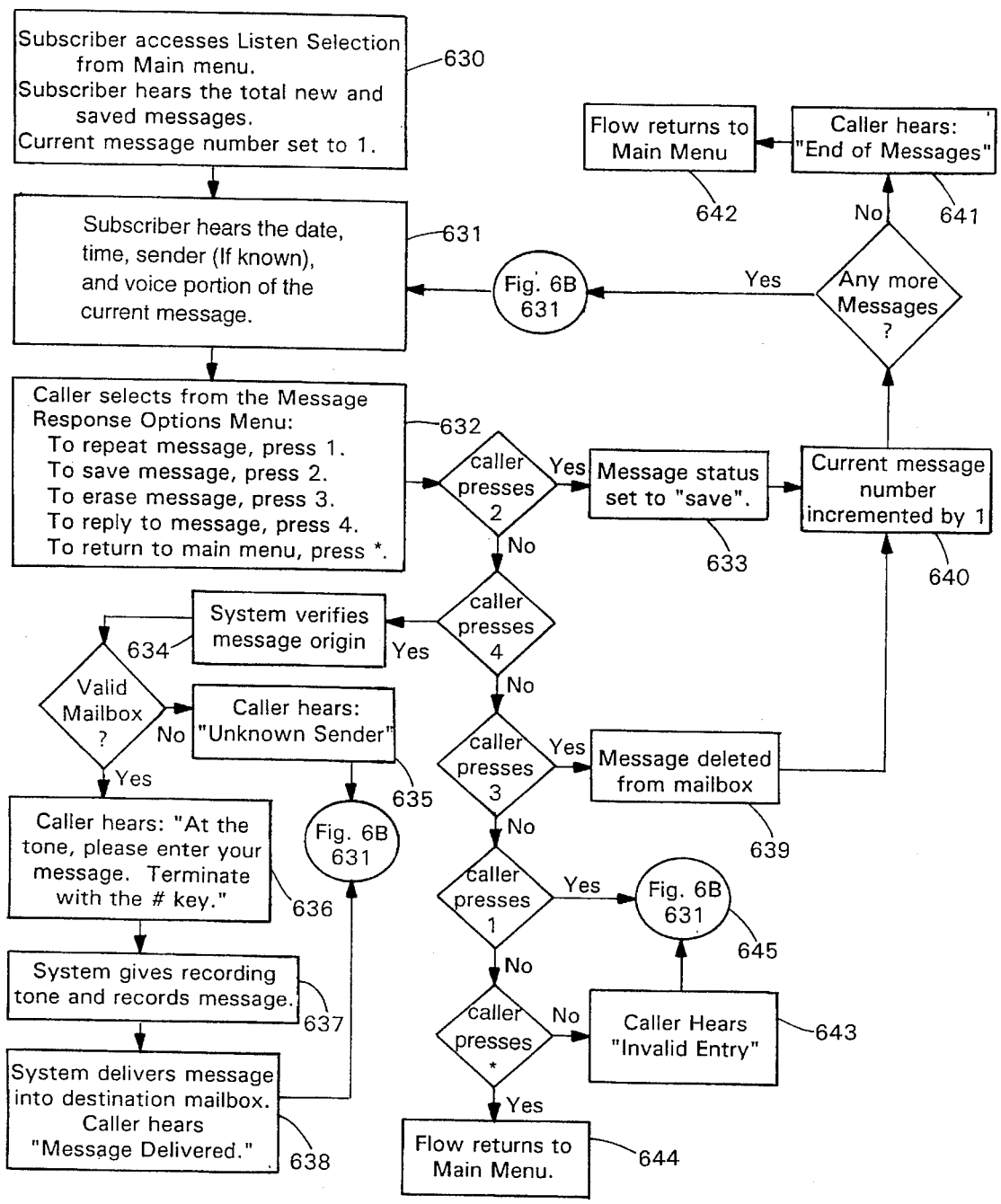
Figure 6C:
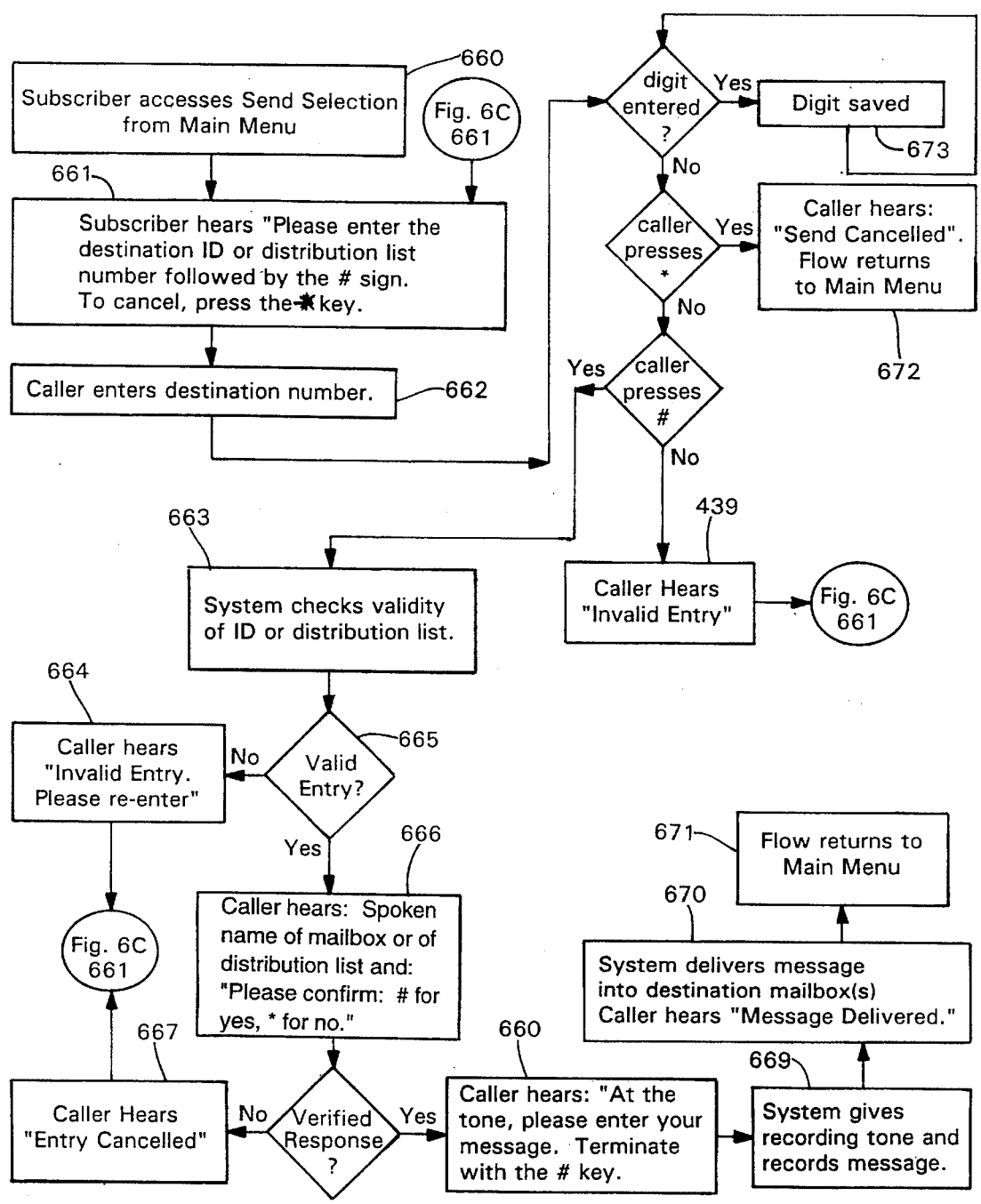
Figure 6D:
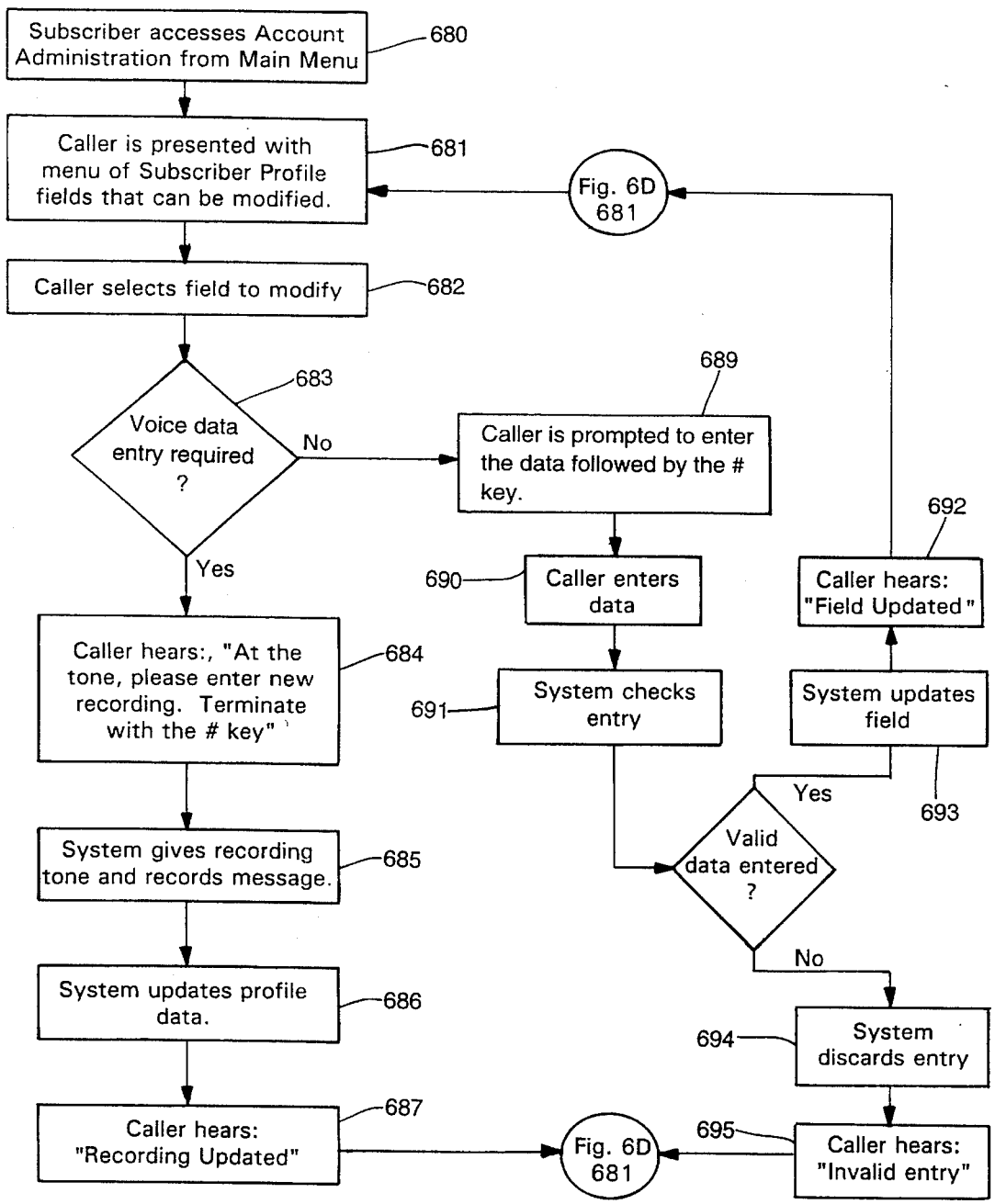

Both the Group Member Main Menu FIG. 6A and the Group Leader Main Menu FIG. 7 are based on the same voice mail user interface standard. In the preferred embodiment, menu selection 1 on both Main Menus allows subscribers to listen to messages FIG. 6B. When callers choose to listen to messages, they first hear the number of new and old messages 630. All of the new messages must be listened to and saved or erased before the old saved messages may be accessed. The system moves on to the next message after each save or erase selection 640, repeating the same sequence of actions. If there is no next message, the caller is told that they have reached the end of the messages 641 and the system returns to the main menu 642. The sequence for each message starts with the playback of the message and information about when it was delivered and who sent it 631. At any point during or after message playback the caller may select from the Message Response Options Menu 632. The caller may have the message repeated 645, or he may save the message 633, or he may erase the message 639, or he may return to the main menu 644, or he may reply to the message 634. The caller may only reply to messages where the message sender mailbox is known. If the message originator is not known, the caller is not allowed to reply 635; if the originator mailbox is known, the caller is prompted 636 to record his reply 637, and the reply is placed into the originator mailbox 638. Main Menu selection 2 on both the Leader and the Member main menus allows callers to send messages FIG. 6C. When a caller chooses to send a message 660 they are prompted to enter the destination mailbox ID or a distribution list number 661. The caller digit entry is saved 673 until the # key or the * key are entered. If the * key is entered, the send function is canceled and the flow returns to the main menu 672. If the # key is entered, the system checks to make sure that the destination mailbox number ID or the distribution list number are valid 663. If the destination is not valid, the caller is asked to re-enter the destination 664. If the destination is valid, the system gives feedback on the address, preferably by playing the recorded name that is associated with the mailbox or the distribution list 666. If the address is incorrect, the user can press * to cancel the address and enter a new one 667. If the sender accepts the address, the system prompts the caller to record the message 668 and gives the recording tone 669. The caller then speaks the message and then presses #. The system then delivers the message to the destination subscriber. If the destination is a distribution list, the list is expanded and the subscribers on the list receive the message 670. In some cases distribution lists contain other distribution lists, in that case all sub-lists are expanded as well. The send function is then completed and the flow returns to the main menu 671. Main Menu selection 3 on both the Group Leader and the Group. Member main menus allow subscribers to modify certain portions of their profile such as their spoken name, their password, or their distribution lists FIG. 6D. When a caller chooses to access Account Administration on their main menu 680, they are presented with a menu of mailbox profile fields that can be modified 681. The caller selects one of the options on this menu. If the data to be entered represents spoken voice data 683, the caller is prompted to speak the new recording at the tone 685. The data is then saved in the subscriber mailbox profile 686, the update is confirmed to the caller 687, and the system flow returns to the menu of profile fields that can be modified 681. If the data to be entered is not voice data, the caller is prompted to enter the new data 689. After the caller enters the new data 690, the entry is verified based on the limits and constraints of the field 691. If the entry is invalid, the entry is not saved 694, the caller is informed that his entry was invalid 695, and the flow returns to the Account Administration menu 681. If the entry was valid, the system updates the subscriber's mailbox profile 693, informs the caller that his record has been updated 692, and the system flow returns to the Account Administration menu 681. Several alternative methods for Account Administration exist that allow the current field values to be reviewed before they are changed.

Figure 4A:
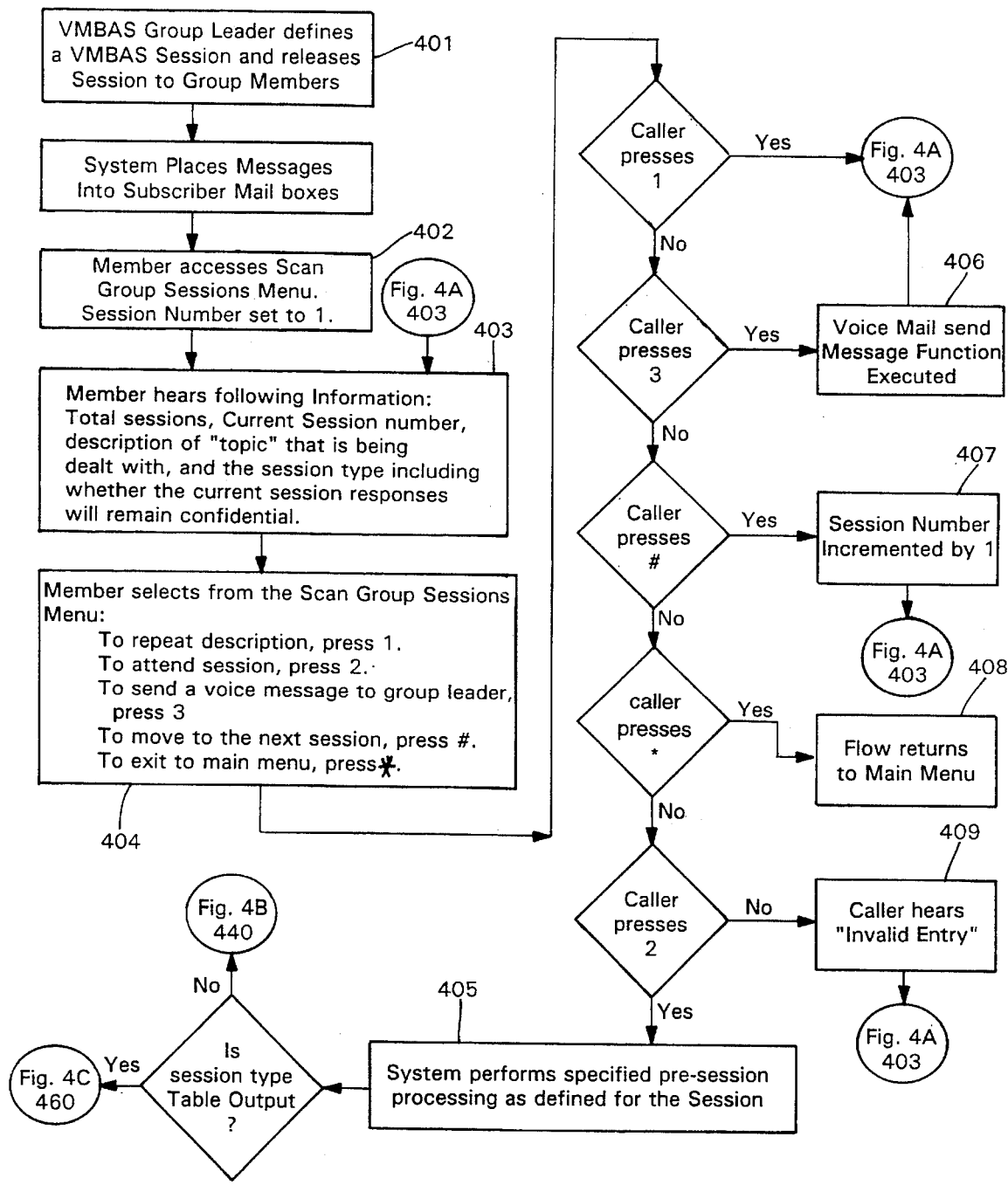
FIGS. 4A through 4O are flow charts that illustrate a method of handling group member subscriber calls to attend an established data exchange session as may be utilized by the preferred embodiment.
Figure 4B:
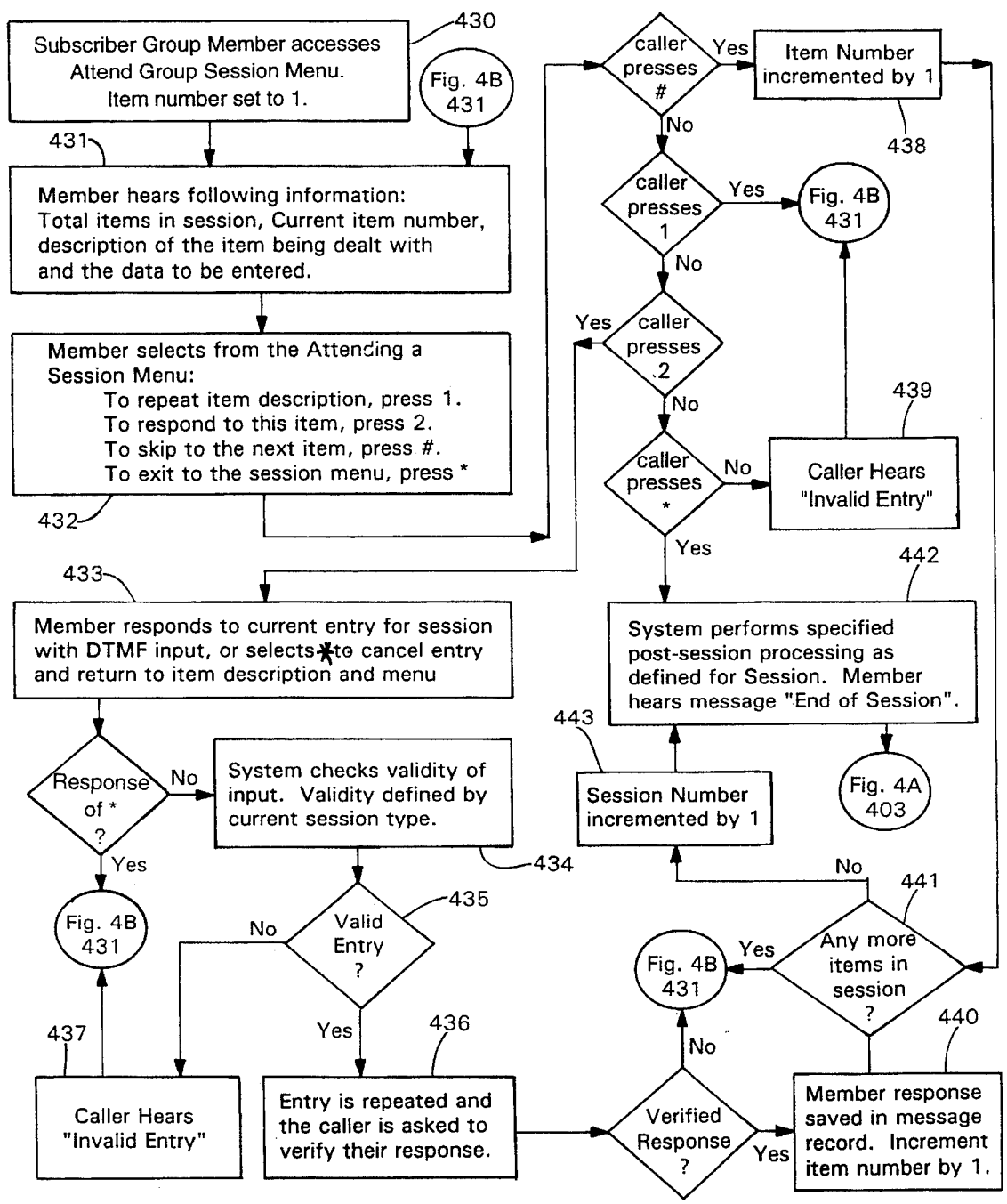
Figure 4C:
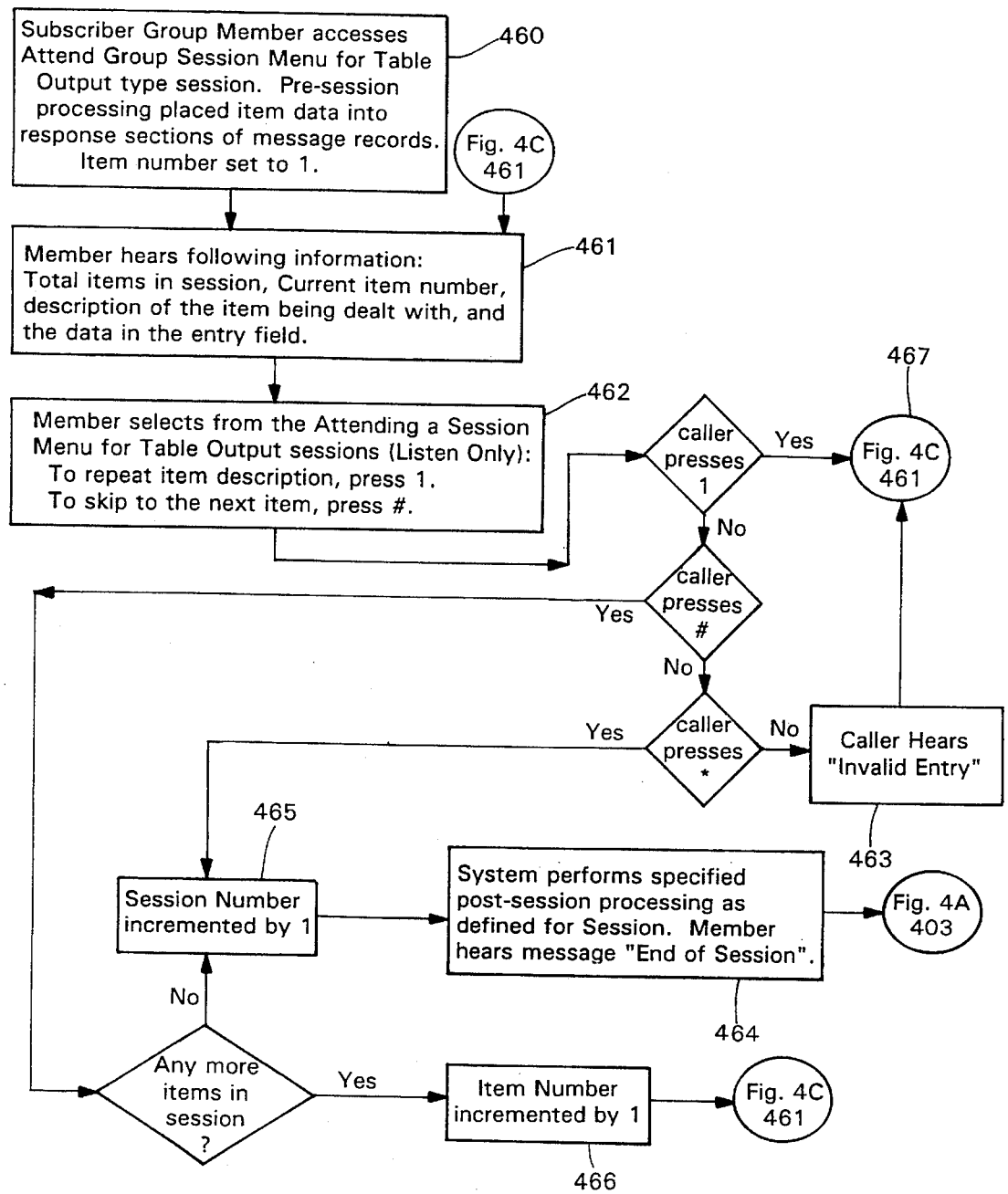

FIG. 4A to FIG. 4C illustrate the preferred method of handling a group member subscriber call to attend established data exchange sessions. Data exchange sessions are initiated if the caller chooses Main Menu selection 4 to Attend Group Sessions as shown on FIG. 6A and FIG. 7. As shown in FIG. 4A, the caller can only access sessions that have been created and released by a group leader 401, and where they are members of the group. When the member first accesses the session 402, the item number is initialized to 1, this becomes the current item. The member can then examine the items in the session.

When each session is accessed the caller hears:

the number of sessions that are established;

the number of the current Session;

the recorded topic for the session which was previously recorded by the group administrator; and, a brief description of the type of session including such pertinent information as whether or not their responses will remain confidential 403.

The member may then select from the Scan Group Session Menu 404. They may elect to skip to the next session by pressing the # key 407, or to hear the session description repeated by pressing the 1 key, or may elect to send a voice message to the administrator by pressing the 3 key 406. After the message is sent by the send function, the caller remains at the same session number and hears the same menu. The caller may also choose to attend the current session by pressing the 2 key.

When the member elects to attend a session, before they enter the session menu, the system performs specific pre-session processing as defined for the session type 405. Only in the Table Output session type has pre-session processing currently been defined. For Table Output type sessions, the system executes the statement in the Data Extraction Statement field of the subscriber record. Typically this is a select statement extracts data from a large computer database system. The items selected are then placed in order into the Entry Data field section for each of the messages in the session 405. From then on, for the duration of the session, it appears to the system as though the member's data had already been entered for each item.

FIG. 4C illustrates the preferred method of handling Group Member attendance of a Table Output Session. When the member first accesses the session 460, the item number is initialized to 1, this becomes the current item. The member can then examine the items in the session. When each item is accessed the caller hears:

the number of items to be considered in this session;

the number of the current item;

the recorded description of the item which was previously recorded by the group administrator; and finally, the data in the Entry Data field that was placed there with the Data Extraction Statement 461.

The member may then select from the Attend a Session menu 462. The group member may select 1 to hear the description again, press the # key to skip to the next item in the session, or press the * key to exit the menu. After they have skipped through the items, or they have selected * to exit the menu, the session has ended. The session number is incremented 465, and any specified post-session processing, as defined for the session, is performed 464. The flow then returns to the Scan Sessions menu for the next session 403. Currently, no post-session processing is defined for Table Output sessions however future implementations may find it useful to document when each item was examined by the group members.

FIG. 4B illustrates the preferred method of handling member attendance of sessions where data is collected from group members. When the member first accesses the session 430, the item number is initialized to 1. This becomes the current item. The member can then examine the items in the session. When each item is accessed the caller hears:

the number of items to be considered in this session;

the number of the current item;

the recorded description of the item which was previously recorded by the group administrator; and finally, if they have already responded to this item, their response 431.

If they have not yet responded to the item, the caller hears: "response requested". The member is then presented with the Attending A Session Menu 432. The caller may then hear a repeat of the description by pressing key 1, or they may respond by pressing key 2. They may also skip the current item by pressing the # key or terminate the session with the * key. If the caller selects * or there are no more items in the session 441, the session is ended. The session number is incremented 443 and any specified post-session processing, as defined for the session, is performed 442. If group members elect to respond, then they are prompted for their entry 433. The entry type and format is determined by the session type. After they have entered their response, the system then checks the entry 434. Each session type may have its own data validity checking procedure. If the entry is invalid then it is rejected 437, and the member is allowed to reconsider the item. If the entry is valid, then it is repeated to the member 436. The member may then accept or reject his or her answer. If the member rejects his or her answer, they re-enter the Attending A Session Menu with no change in the Current Item. If they elect to accept the response, then the item is saved in the Data Entry field in the message record and the item number is incremented 440. The session then continues the Attending A Session Menu with the next item in the session as the current item. After the last item has been reached 441, the session number is incremented 443, and the system performs post-session processing as defined for each session type 442. The flow then returns to the scan sessions menu for the next session 403. Currently, only Table Input and Meeting Scheduling type sessions have post-session processing defined. For Table Input, the system executes the database statement defined in the Data Insertion Statement field of the subscriber's record. Executing this statement will cause the responses entered by the member to be placed into a file or database on some computer system. For Meeting Scheduling type sessions, the system compares the number of group members who have responded that they can attend with the percent quorum number. The first item that exceeds the quorum becomes the selected meeting for that session, and all members are notified of the selected meeting. The phrase "meeting selected" is appended to the selected item's description. An alternative implementation simply notifies the group leader that a quorum is reached by sending a voice message. The group leader then notifies the members of the meeting time and place as appropriate.

The currently defined system supports the following types of session validity checks 434. Opinion Survey Sessions allow entries between 1 and 9. Priority Ranking Sessions force an ordinal ranking of the entries and only allow unique numeric responses. For instance only one entry can be ranked "1", and only one entry can be ranked "2", etc. Priority Ranking Sessions are further constrained by not allowing numbers higher than the number of items in the session. Ballot Vote Sessions and Meeting Schedule Sessions allow a yes (1) or a no (2) vote. Table Input allows a numeric entry of less than 32 digits.

Some of the sessions keep the responses of individual members confidential and only the summary of the responses of all the members is accessible to the group leader. Confidentiality is an essential part of certain group decision-making processes such as Nominal Group Technique and for many balloting procedures. The Meeting Schedule, the Table Input, and the Table Output sessions all allow the Group Leader to examine the individual responses, the other session types do not and the individual responses are not available to the group leader.

A group leader accesses the voice menu session in the same manner as a group member. In fact the group leader can be a member of their own or other groups. FIG. 7 shows the menu options available to group leaders as illustrated in the preferred embodiment. The menu available to group leaders enables them to both attend and administer groups. When attending group sessions, the group leader is handled the same as any group member. The portion of the menu that relates to administering groups allows the creation of new sessions, the removal of sessions, the restarting of sessions, and allows the leader to listen to the responses to the items in a session.

Figure 5:
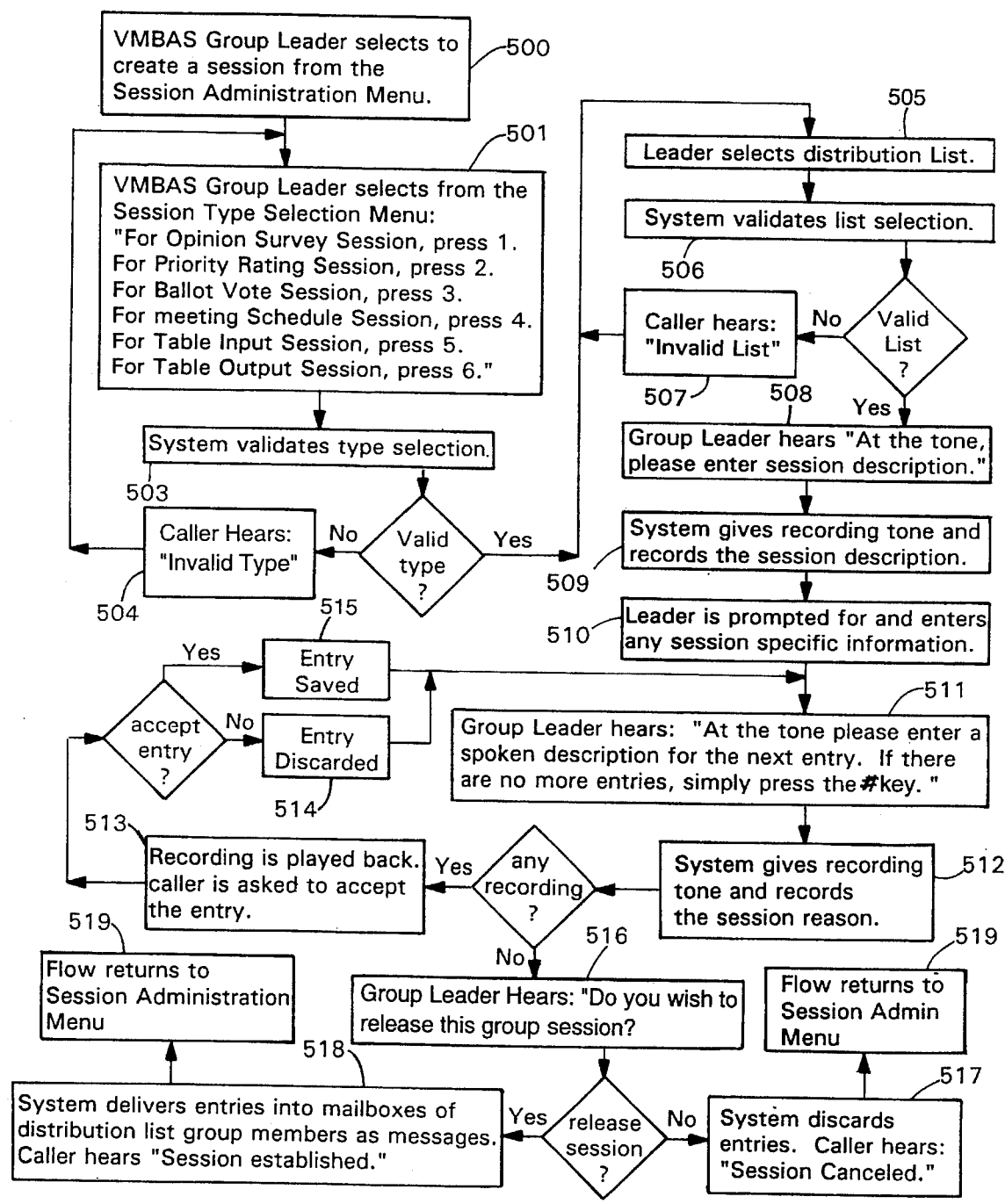
FIG. 5 is a flow chart that illustrates a method of handling group leader establishment of a data exchange session as may be utilized by the preferred embodiment.

As shown in FIG. 5, when creating a session, the leader first selects to create a session from the Session Administration menu 500. The leader then selects the type of session to be created 501 from the Session Type Selection Menu. If the Session Type entered 503 is invalid, the caller is told that their entry is invalid 504 and is returned to the Session Type Selection Menu. If the Session Type was valid, the Group Leader is prompted to identify a distribution list 505. The distribution list selected then identifies the group that will participate in the session and identifies the population of designated subscribers. The system then validates the list selected 506. If the list identified is not valid, the caller is informed that their selection was invalid 507, and they are allowed to make a new selection. In the current embodiment, the voice mail personal distribution lists are used to define group membership. This provides a convenient and familiar method for most voice mail system users. Once the Leader has identified a group of subscribers 505 and a session type 501, they are prompted to enter a description of the session 508. This is a general description of the session's purpose and is used to prepare the group members to respond to the individual entries in the session. For instance, a meeting scheduling session description might be "The following are the alternatives for the February Staff meeting". The Group Leader then enters any session type specific information 510. An illustration is for Meeting Scheduling Sessions, where the percent of attendance required for a quorum can optionally be entered. The Leader then enters a description for each item in the session 511 at the prompt tone 512. After each recording, the item is played back to the Leader 513 for confirmation; the recording is saved 515 or discarded 514 based on leader acceptance. After the last item description has been recorded the Group Leader decides whether or not to release the session 516. If the session is not released, the system discards the information entered 517 and the flow returns to the Session Administration Menu 519. If the Leader releases the session, the system places the entries into the mailboxes of the subscribers who were on the distribution list and the system confirms that the session was established 518. The flow then returns to the Session Administration Menu 519.

When the Group Leader chooses to remove a session FIG. 7, the group leader is guided through each of the sessions. The session topic is heard, and the leader has the option of deleting the session. If they choose to delete the session, they are asked to confirm this deletion: "Are you sure you wish to delete the following session:"—topic description is heard here—"please enter # to delete and * to not delete". The same approach is used to restart a session, the sole difference being that a suitable confirmation phrase might be: "Are you sure you wish to restart the following session:"—topic description is heard here—"please enter # to restart and * to not restart". When deleting a session, all messages and information related to that session are removed from the system. When restarting a session, all session items are also removed, but the group distribution list number, the session topic description, and any session specific information remain. The flow of restart then becomes the flow of create after entry of the session description 509.

When listening to the results of a session, the group leader is guided through each of the sessions. The session topic description is spoken, and then the current results for each item is presented. Each session type may have a slightly different manner of presenting the results, but all sessions typically start the description of each item's totals the same way. First the item description is stated, then the total and percent responding are presented, then the session specific presentation occurs. With Opinion Survey and Priority Ranking item results, first the average for the item is given, then the sum of the responses, and then a ranked list of the responses is presented. The specific members responding, and what they responded is not available. With Ballot Vote and Meeting Schedule Sessions, the total number of yes and no responses is given. With Meeting Schedule Sessions, the list of each subscriber's answers is also available. With table input and table output, the average for each item is given, and then the specific responses of each member to the items is given.

Voice Messaging Systems typically provide one or more methods for making the mapping of subscriber ID's to subscriber names available to all subscribers. Distribution lists, also known as group lists when they are used for group sessions, are made up of subscriber ID's and are stored in the subscriber profile information 210. Alphabetized indexes are usually published by the system administrator that relate subscriber names to their ID's. This is especially simple when the ID is also the subscriber's telephone number. Some systems additionally provide various methods of telephone access to directory assistance. In these systems, as an option, the caller can spell a portion of the subscriber's name and hear the corresponding ID's and spoken names. The method for spelling varies, but typically involves using the Dual Tone Multi-Frequency codes associated with each letter on the telephone keypad. A standard telephone interface for spelling with the telephone keypad is currently being considered by the American Information Industry and the American National Standards Institute.

Pre-session processing statements 405 which are defined for Table Output sessions contain a data extraction statement. This statement allows data to be collected from an external file or database and to be placed into the Voice Message Database so that it can be presented to the group member as part of a session. Post-session processing statements 464 and 442 contain a data insertion statement. Such a statement allows data that has been collected from a group member during a session to then be taken from the Voice Message Database and placed into an external file or database. These pre-session and post-session statements are executed as part of the session and optionally allow the subscriber's ID to be included as part of the statement. These insertion and extraction statements allow data to be moved between the voice mail database and external databases or files. The external databases or files may be located on the same or on different systems. Most file and database systems known in the art provide file and database manipulation functions in a stored program form. While there are many alternatives, the preferred method for defining data insertion and extraction statements uses an industry standard data manipulation language such as ANSI standard SQL. For illustrative purposes, an example of a data insertion statement can be taken from the current implementation. In this example, data is taken from the Voice Message System Database and appended to an ASCII file with the following statement: "database voice_mail; select message entry_data where session_number=2 into tempfile". This example statement, which is stored in a file, can be executed by the voice mail system and creates a file called tempfile that contains group member responses. This tempfile can then be printed or moved. In the current embodiment the data insertion and data extraction statements are entered into the system at a terminal 150 and are stored in each subscriber's profile record 230. Group leaders may create their own statements if they have the knowledge, the tools, and the permissions required. However because access to the voice mail and to the external databases are often restricted, most group leaders send voice messages to the system administrator requesting that a statement be prepared for them.

The principal terminal functions 150 are those required by the Voice Message System administration. The methods that the Voice Message System allows for maintenance of Subscriber Profiles and of distribution lists will determine the method that is used by the Voice Message Based Administration System. It is assumed that all systems will allow a method of maintaining the subscriber record and distribution lists that is mutually convenient for administration and for subscribers. In the current embodiment, voice mail distribution lists can be maintained via terminal input or by telephone keypad entry as one of the Account Administration services available from the Main Menu.

Although the invention has been described herein with reference to a specific embodiment, many modifications and variations therein will readily occur to those skilled in the art. Accordingly, all such variations and modifications are included within the intended scope of the present invention as defined by the following claims.

What is claimed is:

1. A telephone based voice message system (VMS) having a group of subscribers who leave recorded messages for other subscribers and access recorded messages from other subscribers, the improvement comprising:

a voice message based administration system (VMBAS) having a plurality of session types for allowing controlled data presentation interactions, wherein at least one subscriber enables any of a number of the controlled data presentation interactions with other subscribers;

means for said at least one subscriber to choose a session type for controlled data presentation interactions;

means for defining data extraction statements for the chosen session type for extracting data presented during said chosen session;

means for enabling a population of designated subscribers from the group of subscribers of the voice message system to take part in said chosen session;

means for providing a descriptive recorded message for each data extraction statement defined for said chosen session;

means for a designated subscriber to attend said chosen session and respond to each data presentation interaction;

means for maintaining the identity of said responding designated subscriber confidential; and means for processing said designated subscriber responses.

2. The telephone based voice message system of claim 1 wherein said session type comprises a Table Output session.

3. The telephone based voice message system of claim 2 wherein the Table Output Session comprises Rate or Spot pricing information.

4. The telephone based voice message system of claim 2 wherein the Table Output Session comprises information on vacation or sick day availability.

5. The telephone based voice message system of claim 2 wherein the Table Output Session comprises information allowing an inquiry tracking an order.

6. The telephone based voice message system of claim 2 wherein the Table Output Session comprises information permitting a query on available inventory.

7. The telephone based voice message system of claim 2 wherein the Table Output Session comprises information on scheduling of work hours.

8. A telephone based voice message system having a group of subscribers who leave recorded messages for other subscribers and access recorded messages from other subscribers, the improvement comprising:

a voice based adminstration system (VMBAS) having a plurality of session types for allowing controlled data presentation interactions, wherein at least one subscriber enables any of a number of available controlled data collection interactions with other subscribers;

means for said at least one subscriber to choose a session type for controlled data collection interactions;

means for defining data insertion statements for the chosen session for exporting data collected during said session;

means for enabling a population of designated subscribers from the group of subscribers of the voice message system to take part in said session;

means for providing a descriptive recorded message for said data insertion statements defined for said session;

means for a designated subscriber to attend said chosen session and respond to each data presentation interaction;

means for maintaining the identity of said responding designated subscriber confidential; and means for processing said designated subscriber responses.

9. The telephone based voice message system of claim 8 wherein said session comprises an Opinion Survey Session.

10. The telephone based voice message system of claim 8 wherein said session comprises a Priority Survey Session.

11. The telephone based voice message system of claim 8 wherein said session comprises a Ballot Voting Session.

12. The telephone based voice message system of claim 8 wherein said session comprises a Table Input Session.

13. The telephone based voice message system of claim 12 wherein said Table Input Session permits recording of time and expense data.

14. The telephone based voice message system of claim 12 wherein said Table Input Session permits recording of time card data.

15. The telephone based voice message system of claim 12 wherein said Table Input Session permits recording of field worker data.

16. The telephone based voice message system of claim 12 wherein said Table Input Session permits recording of order entry information.

17. A telephone based voice message system having a group of subscribers who leave recorded messages for other subscribers and access recorded messages from other subscribers, wherein the improvement comprises the addition to said voice message system of:

a voice based adminstration system wherein at least one subscriber enables any of a number of available session types for controlled data presentation and collection interactions with other subscribers;

means for said at least one subscriber to choose a session type from the available controlled data presentation and collection interactions;

means for defining data extraction statements for the chosen session type for extracting data presented during said chosen session;

means for defining data insertion statements for exporting data collected during said chosen session;

means for enabling a population of designated subscribers from the group of subscribers of the voice message system to take part in said chosen session;

means for providing a descriptive recorded message for each data insertion statement and each data extraction statement defined for said chosen session;

means for a designated subscriber to attend said chosen session and respond to each data presentation interaction;

means for maintaining the identity of said responding designated subscriber confidential; and means for processing said designated subscriber responses.

18. The telephone based voice message system of claim 17 wherein said chosen session comprises a Meeting Scheduling Session.

19. The telephone based voice message system of claim 17 wherein said chosen session comprises a Voice Forum.

20. The telephone based voice message system of claim 17 wherein said chosen session comprises a Group Decision-Making Support Session.

21. The telephone based voice message system of claim 20 wherein said Group Decision-Making Support Session comprises a Nominal Group Decision-Making Support Session.

22. The telephone based voice message system of claim 20 wherein said Group Decision-Making Support Session comprises a Delphi Group Decision-Making Support Session.

23. In a voice message based administration system (VMBAS) comprising a group of subscribers, wherein at least one subscriber enables any of a number of available sessions for controlled data presentation interactions with other subscribers, a method for enabling data presentation using the VMBAS comprising the steps of:

a) choosing a session type from the available session types for controlled data presentation interactions;

b) defining data extraction statements for the chosen session type for extracting data presented during said session;

c) enabling a population of designated subscribers from the group of subscribers to take part in said session;

d) providing a descriptive recorded message for each defined data extraction statement in said session; and e) maintaining the identity of a designated subscriber attending said session and responding to said data presentation interaction confidential.

24. In a voice message based administration system (VMBAS) comprising a group of subscribers, wherein at least one subscriber enables any of a number of available sessions for controlled data collection interactions with other subscribers, a method for collecting data using the VMBAS comprising the steps of:

a) choosing a session type from the available session types for controlled data collection interactions;

b) defining data insertion statements for the chosen session type for exporting data collected during said session;

c) enabling a population of designated subscribers from the group of subscribers to take part in said session;

d) providing a descriptive recorded message for each data insertion statement defined for said session; and e) maintaining the identity a designated subscriber attending said session and responding to said data presentation interaction confidential.

25. In a voice message based administration system (VMBAS) comprising a group of subscribers, wherein at least one subscriber enables any of a number of available sessions for controlled data presentation and collection interactions with other subscribers, a method for presenting and collecting data using the VMBAS comprising the steps of:

a) choosing a session type from the available session types for controlled data presentation and collection interactions;

b) defining data extraction statements for the chosen session type for extracting data presented during said session;

c) defining data insertion statements for exporting data collected during said session;

d) enabling a population of designated subscribers from the group of subscribers to take part in said session;

e) providing a descriptive recorded message for each defined data extraction statement and data insertion statement in said session; and f) maintaining the identity of a designated subscriber attending said session and responding to said data presentation interaction confidential.

26. A telephone based voice message system (VMS) having a group of subscribers who leave recorded messages for other subscribers and access recorded messages from other subscribers, the improvement comprising the addition to said voice message system of a meeting scheduling tool;

a shift scheduling tool;

a voice forum tool; and a group-decision making support tool, wherein said group-decision making support tool includes means for maintaining an identity of a subscriber leaving a recorded response confidential.

27. The voice message system of claim 26 wherein said group-decision making support tool employs a Delphi technique for forecasting and predictive activities.

28. The voice message system of claim 26 wherein said group-decision making support tool employs a Nominal Group technique to identify problems, solve problems, and plan problem tasks.

29. A telephone based voice message based administration system (VMBAS) having a group of subscribers, wherein at least one subscriber is a group leader, the VMBAS comprising:

means for a group leader to create a session, the session including at least one data exchange item;

means for at least one selected subscriber to attend said session;

means for the selected subscriber to examine said at least one data exchange item;

means for the selected subscriber to respond to said at least one data exchange item;

means for maintaining the identity of said responding subscriber confidential;

processor means for analyzing said item response;

means for providing said analyzed response to said group leader; and means for the group leader to provide the analyzed response to at least one other subscriber from the group of subscribers.

30. The system of claim 29 further comprising means for validating the response using preselected criteria.

31. The system of claim 29 wherein said response comprises a DTMF response.

32. The system of claim 29 wherein said means for said group leader to create a session further comprises:

means for entering a recorded description for each session; and means for specifying data to be collected during said session.

33. The system of claim 29 further comprising means for exporting said responses to an external storage location.

34. The system of claim 29 wherein said analyzed response includes a percentage of responding subscribers, a summary of all responses, a total for each item response, and an average for each item response.

* * * * *